United States Patent
Li et al.

(10) Patent No.: US 10,346,391 B2
(45) Date of Patent: *Jul. 9, 2019

(54) VERTICAL TUNING OF DISTRIBUTED ANALYTICS CLUSTERS

(71) Applicant: International Business Machines Corporation, Armonk, NY (US)

(72) Inventors: Min Li, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,393

(22) Filed: Jul. 20, 2018

(65) Prior Publication Data
US 2018/0329943 A1    Nov. 15, 2018

Related U.S. Application Data

(63) Continuation of application No. 14/820,493, filed on Aug. 6, 2015, now Pat. No. 10,073,880.

(51) Int. Cl.
*G06F 16/23* (2019.01)
*G06F 9/50* (2006.01)
*G06F 16/245* (2019.01)

(52) U.S. Cl.
CPC ........ *G06F 16/2372* (2019.01); *G06F 9/5027* (2013.01); *G06F 16/245* (2019.01)

(58) Field of Classification Search
None
See application file for complete search history.

(56) References Cited

U.S. PATENT DOCUMENTS

| 7,958,511 | B1 | 6/2011 | Pomerantsev et al. |
| 10,073,880 | B2 | 9/2018 | Li et al. |
| 2009/0158276 | A1 | 6/2009 | Barsness et al. |
| 2011/0022870 | A1 | 1/2011 | McGrane et al. |

(Continued)

OTHER PUBLICATIONS

Kanu et al., "Dynamic Cluster Configuration Algorithm in MapReduce Cloud," International Journal of Computer Science and Information Technologies, vol. 5, Issue 3, May 2014, pp. 4028-4033.

(Continued)

*Primary Examiner* — Wynuel S Aquino
(74) *Attorney, Agent, or Firm* — Zilka-Kotab, P.C.

(57) ABSTRACT

In another general embodiment, a method includes receiving an application, determining whether the application matches another application saved to a database, in response to determining that the application does not match another application saved to the database, performing one or more test runs of the application, determining one or more resource consumption patterns for the application, based on the one or more test runs of the application, estimating one or more parameters of the application, based on the one or more resource consumption patterns, and saving a configuration for the application, in response to determining that the application does match another application, executing the application using the saved configuration for the matching application, monitoring statistics and resource usage, updating the one or more parameters, adjusting the execution of the application, utilizing the updated one or more parameters, and saving the updated one or more parameters of the application.

20 Claims, 7 Drawing Sheets

(56) References Cited

U.S. PATENT DOCUMENTS

| | | |
|---|---|---|
| 2013/0132967 A1 | 5/2013 | Soundararajan et al. |
| 2013/0174149 A1 | 7/2013 | Dasgupta et al. |
| 2013/0254196 A1 | 9/2013 | Babu et al. |
| 2014/0047095 A1 | 2/2014 | Breternitz et al. |
| 2014/0047341 A1 | 2/2014 | Breternitz et al. |
| 2015/0012634 A1 | 1/2015 | Zhu et al. |
| 2017/0039236 A1 | 2/2017 | Li et al. |

OTHER PUBLICATIONS

Lee et al., "Heterogeneity-Aware Resource Allocation and Scheduling in the Cloud," Proceedings of the 3rd USENIX Conference on Hot topics in Cloud Computing, Jun. 14, 2011, pp. 1-4.

Wu et al., "A Self-Tuning System based on Application Profiling and Performance Analysis for Optimizing Hadoop MapReduce Cluster Configuration," IEEE, 20th International Conference on High Performance Computing (HiPC), Dec. 18-21, 2013, pp. 89-98.

Li et al., U.S. Appl. No. 14/820,493, filed Aug. 6, 2015.

Non-Final Office Action from U.S. Appl. No. 14/820,493, dated Sep. 22, 2016.

Palanisamy et al., "Cura: A Cost-optimized Model for MapReduce in a Cloud.In Parallel & Distributed Processing," IEEE 27th International Symposium on Parallel and Distributed Processing, 2013, 12 pages.

Shi et al., "MRTuner: A Toolkit to Enable Holistic Optimization for MapReduce Jobs," of the VLDB Endowment vol. 7, No. 13, 2014, pp. 1319-1330.

Herodotou et al., "Starfish: A Selftuning System for Big Data Analytics," 5th Biennial Conference on Innovative Data Systems Research, Jan. 9-12, 2011, pp. 261-272.

Liao et al., "Gunther: Search-Based Auto-Tuning of MapReduce," Euro-Par, 2013, pp. 406-419.

Palanisamy et al., "Cost-Effective Resource Provisioning for MapReduce in a Cloud," IEEE Transactions on Parallel and Distributed Systems, vol. 26, No. 5, May 2015, pp. 1265-1279.

Final Office Action from U.S. Appl. No. 14/820,493, dated May 5, 2017.

Non-Final Office Action from U.S. Appl. No. 14/820,493, dated Sep. 25, 2017.

Notice of Allowance from U.S. Appl. No. 14/820,493, dated May 3, 2018.

List of IBM Patents or Patent Applications Treated As Related.

VERTICAL TUNING OF DISTRIBUTED ANALYTICS CLUSTERS

BACKGROUND

The present invention relates to data analytics platforms, and more particularly, this invention relates to vertical tuning of distributed analytics clusters in cloud storage systems and networks.

Traditionally, to run a data analytics application, one or more virtual machines or containers are first provisioned in a cloud. Subsequently, a data analytic platform, such as, for example, Hadoop or Spark, is deployed on the virtual machines or containers. The data analytics application is then run on top of the platform. Parameters configured for the data analytics platform, as well as parameters configured for the virtual machines or containers, impact performance of the data analytics application.

Currently, parameter tuning of data analytics platforms suffers from many drawbacks. For example, resource provisioning tends to be a coarse-grained approach that first allocates a number of virtual machines, and then runs a data analytic platform on top of those virtual machines, without considering, when provisioning the virtual machines, characteristics of the workload running on the data analytics platform. In other words, there is no joint consideration of the various layers during configuration.

BRIEF SUMMARY

In one general embodiment, a computer program product is provided, where the computer program product comprises a computer readable storage medium having program instructions embodied therewith, where the program instructions are executable by a processor to cause the processor to receive, by the processor, an application, determine, by the processor, whether the application matches another application saved to a database, in response to determining that the application does not match another application saved to the database, perform, by the processor, one or more test runs of the application, determine, by the processor, one or more resource consumption patterns for the application, based on the one or more test runs of the application, estimate, by the processor, one or more parameters of the application, based on the one or more resource consumption patterns, and save, by the processor, a configuration for the application to the database, where the configuration includes the one or more estimated parameters of the application, in response to determining that the application does match another application saved to the database, execute, by the processor, the application using the saved configuration for the matching application, including one or more parameters of the matching application, from the database, monitor, by the processor, statistics and resource usage during the execution of the application, update, by the processor, the one or more parameters of the application for the application, based on the statistics and the resource usage, the updating including estimating a size of a sort buffer, based on a monitored output of a map task, estimating a size of a reduce buffer, based on a monitored input to a reduce task, updating a value of a parameter that controls a size of the sort buffer, and updating a value of a parameter that controls a size of the reduce buffer, adjust, by the processor, the execution of the application, utilizing the updated one or more parameters of the application, and save, by the processor, the updated one or more parameters of the application to the saved configuration for the application to the database.

In another general embodiment, a method is provided, where the method includes receiving an application, determining whether the application matches another application saved to a database, in response to determining that the application does not match another application saved to the database, performing one or more test runs of the application, determining one or more resource consumption patterns for the application, based on the one or more test runs of the application, estimating one or more parameters of the application, based on the one or more resource consumption patterns, and saving a configuration for the application to the database, where the configuration includes the one or more estimated parameters of the application, in response to determining that the application does match another application saved to the database, executing the application using the saved configuration for the matching application, including one or more parameters of the matching application, from the database, monitoring statistics and resource usage during the execution of the application, updating the one or more parameters of the application for the application, based on the statistics and the resource usage, the updating including estimating a size of a sort buffer, based on a monitored output of a map task, estimating a size of a reduce buffer, based on a monitored input to a reduce task, updating a value of a parameter that controls a size of the sort buffer, and updating a value of a parameter that controls a size of the reduce buffer, adjusting the execution of the application, utilizing the updated one or more parameters of the application, and saving the updated one or more parameters of the application to the saved configuration for the application to the database.

In another general embodiment, a system includes a processor, and logic integrated with the processor, executable by the processor, or integrated with and executable by the processor, where the logic is configured to cause the processor to receive an application, determine whether the application matches another application saved to a database, in response to determining that the application does not match another application saved to the database, perform one or more test runs of the application, determine one or more resource consumption patterns for the application, based on the one or more test runs of the application, estimate one or more parameters of the application, based on the one or more resource consumption patterns, and save a configuration for the application to the database, where the configuration includes the one or more estimated parameters of the application, in response to determining that the application does match another application saved to the database, execute the application using the saved configuration for the matching application, including one or more parameters of the matching application, from the database, monitor statistics and resource usage during the execution of the application, update the one or more parameters of the application for the application, based on the statistics and the resource usage, the updating including estimating a size of a sort buffer, based on a monitored output of a map task, estimating a size of a reduce buffer, based on a monitored input to a reduce task, updating a value of a parameter that controls a size of the sort buffer, and updating a value of a parameter that controls a size of the reduce buffer, adjust the execution of the application, utilizing the updated one or more parameters of the application, and save the updated one or more parameters of the application to the saved configuration for the application to the database.

Other aspects and embodiments of the present invention will become apparent from the following detailed descrip-

DETAILED DESCRIPTION

Figure 1:
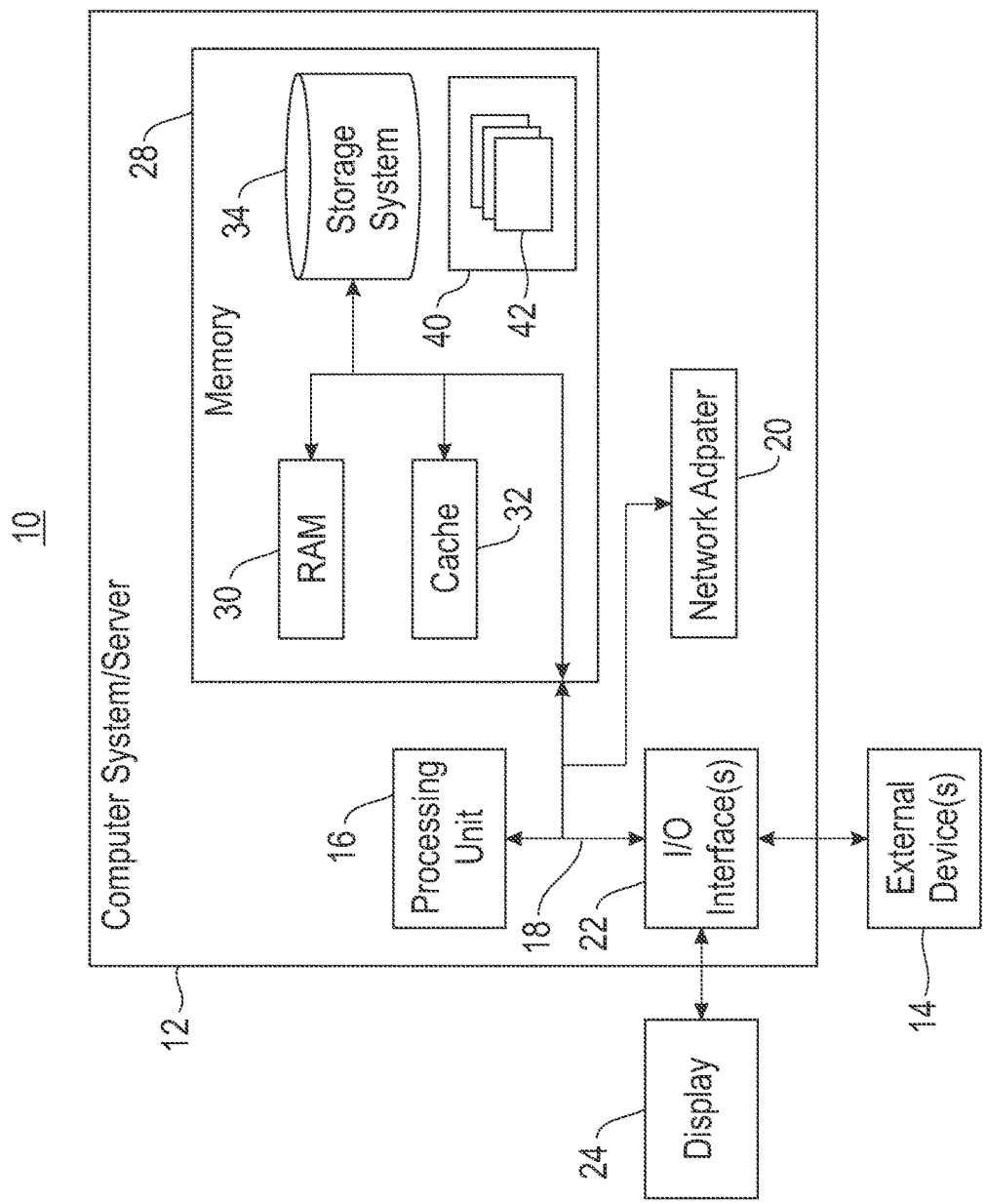
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of vertically tuning distributed analytics clusters.

In one general embodiment, a method is provided for vertically tuning a distributed analytics cluster. The method includes receiving a job, and determining whether the job matches another job saved to a job database. The method also includes performing offline tuning for the job when the job does not match another job saved to the job database. Additionally, the method includes launching the job using a job configuration from the job database, and, after launching the job using the job configuration from the job database, performing online tuning for the job. The online tuning includes vertically tuning infrastructure-level and application-level parameters between phases of execution of the job. The method also includes updating the job configuration in the job database.

In another general embodiment, a system is provided for vertically tuning a distributed analytics cluster. The system comprises a processor and logic integrated with and/or executable by the processor, where the logic is configured to cause the processor to receive a job, and determine whether the job matches another job saved to a job database. The logic is also configured to cause the processor to, when the job does not match another job saved to the job database, perform offline tuning for the job. Additionally, the logic is configured to cause the processor to launch the job using a job configuration from the job database, and, after launching the job using the job configuration from the job database, perform online tuning for the job. The online tuning includes vertically tuning infrastructure-level and application-level parameters between phases of execution of the job. Also, the logic is configured to cause the processor to update the job configuration in the job database.

In another general embodiment, a computer program product is provided for vertically tuning a distributed analytics cluster. The computer program product comprises a computer readable storage medium having program instructions embodied therewith, where the program instructions are executable by a processor to cause the processor to receive a job, and determine whether the job matches another job saved to a job database. Also, the program instructions are executable by the processor to cause the processor to perform offline tuning for the job when the job does not match another job saved to the job database. Additionally, the program instructions are executable by the processor to cause the processor to launch the job using a job configuration from the job database, and, after launching the job using the job configuration from the job database, perform online tuning for the job. The online tuning includes vertically tuning infrastructure-level and application-level parameters between phases of execution of the job. Moreover, the program instructions are executable by the processor to cause the processor to update the job configuration in the job database.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
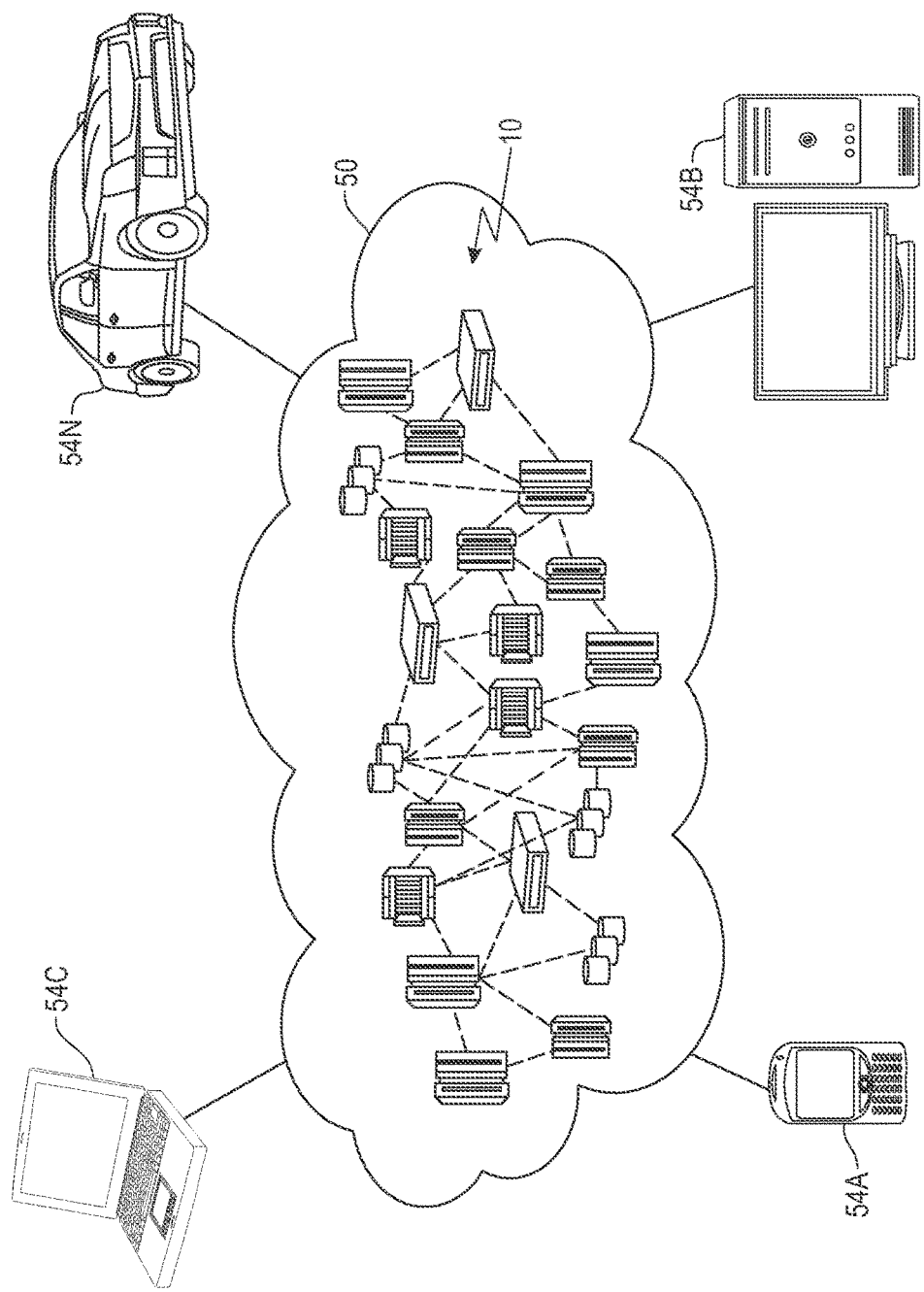
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
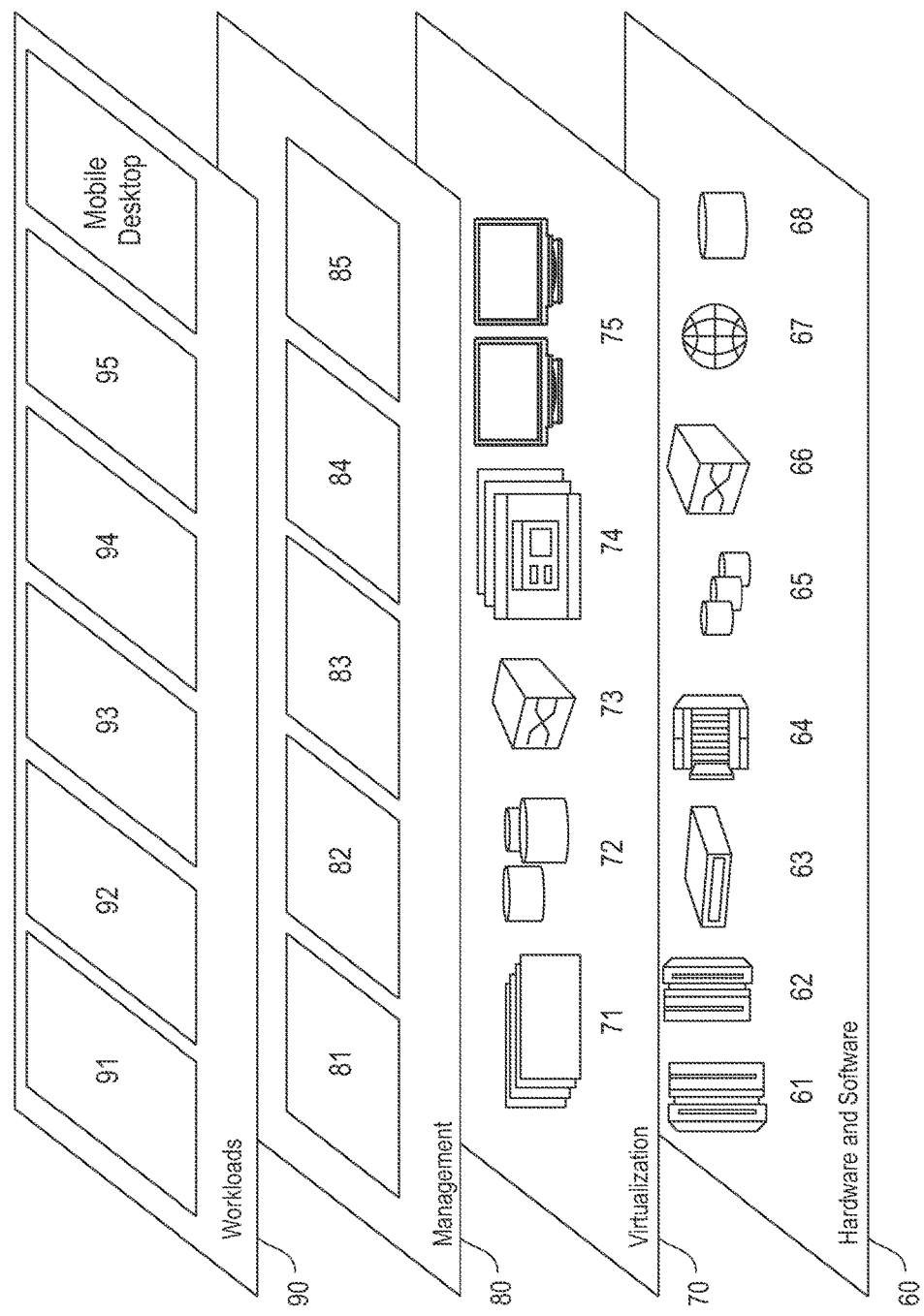
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Further, the management layer 80 may include logic for vertically tuning distributed analytics clusters.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 4:
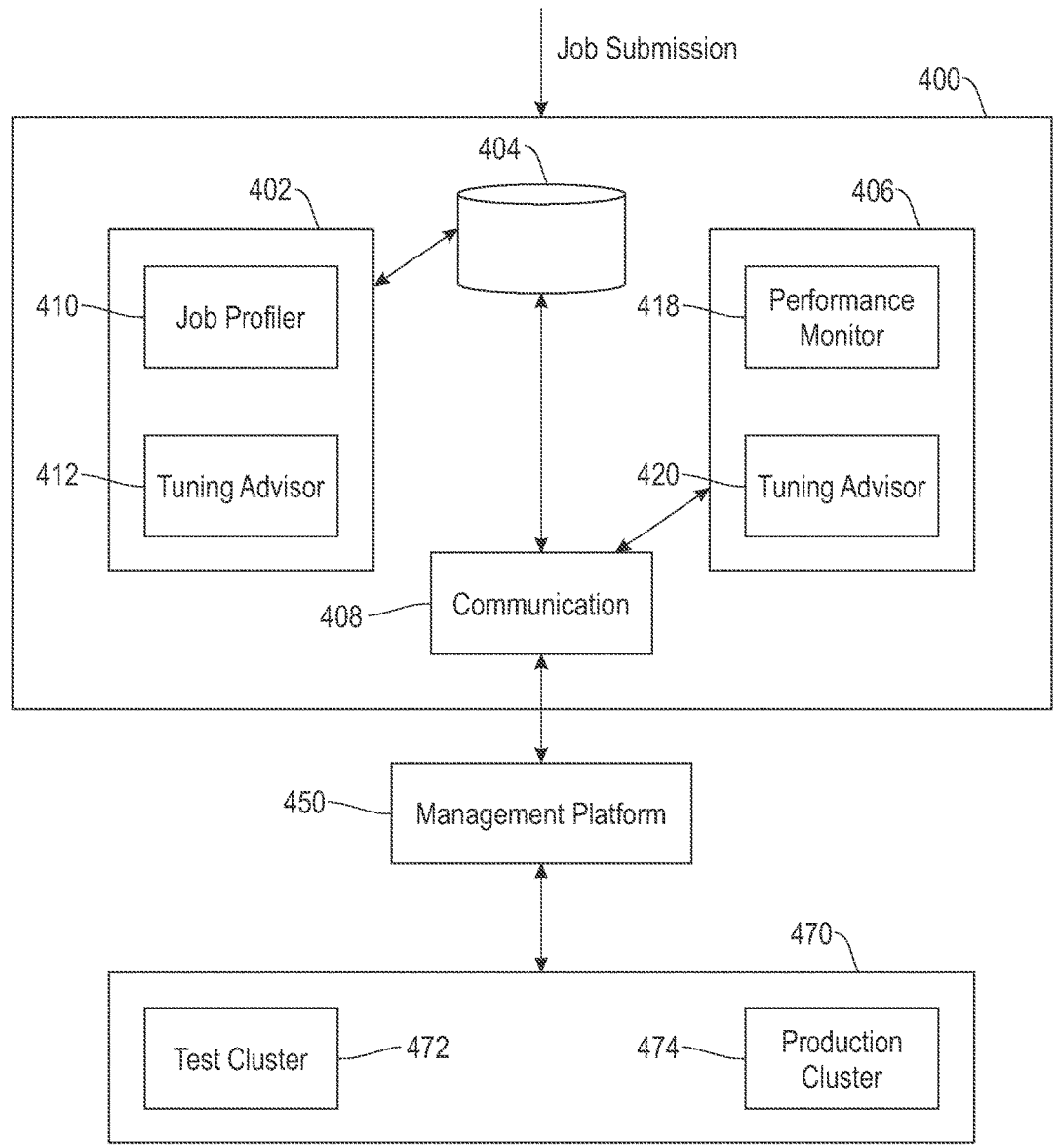
FIG. 4 shows tuning system for vertically tuning distributed analytics clusters, in accordance with one embodiment.

FIG. 4 depicts a tuning system 400 for vertically tuning distributed analytics clusters in cloud environments, in accordance with one embodiment. As an option, the tuning system 400 may be implemented in conjunction with features from any other embodiment listed herein, such as those described with reference to the other FIGS. Of course, however, such tuning system 400 and others presented herein may be used in various applications and/or in permutations which may or may not be specifically described in the illustrative embodiments listed herein. Further, the tuning system 400 presented herein may be used in any desired environment.

As shown in FIG. 4, the tuning system 400 includes an offline tuning component 402, a job database 404, an online tuning component 406, and a communicator 408. Further, the offline tuning component 402 is shown to include a job profiler 410 and a tuning advisor 412. Similarly, the online tuning component 406 is shown to include a performance monitor 418 and a tuning advisor 420.

FIG. 4 further shows a management platform 450 in communication with the tuning system 400, and a physical environment 470 in communication with the management platform 450.

As illustrated in FIG. 4, the physical environment 470 includes clusters of virtual machines (VMs) or containers. More specifically, the physical environment 470 is shown to comprise a test cluster 472 and a production cluster 474. Although the physical environment is shown to include a single test cluster 472 and a single production cluster 474, it is understood that the physical environment may include a plurality of test clusters 472 and/or production clusters 474. As described in more detail below, the tuning system 400 may vertically tune the analytics clusters of the physical environment 470.

In one embodiment, the production cluster 474 comprises VMs or containers on physical resources that may be used as a production environment. The production cluster 474 may include resources that are available for use by end users. For example, resources of the production cluster 474 may be used by an end user in exchange for payment from the end user. Jobs executing on the production cluster 474 may undergo tuning by the offline tuning component 402 and the online tuning component 406.

In contrast, the test cluster 472 comprises VMs or containers on physical resources that may be used for testing purposes. For example, resources of the test cluster 472 may be used for executing test runs of jobs. Statistics collected from the test runs of a job executed on the test cluster 472 may be stored in the job database 404 in association with the job, as will be discussed in more detail below.

In various embodiments, a job may be executed on an analytics platform, where the analytics platform is configured on top of VMs or containers of the physical environment 470 (i.e., an analytics platform is configured on top of VMs or containers of an analytics cluster, such as the test cluster 472 or the production cluster 474). Examples of data analytics platforms include Hadoop and Spark. For simplicity, the below description may refer to an analytics platform executing on VMs, but it is understood that the description may be equally applicable to an analytics platform executing on containers. Containers may be abstracted at an operating system (OS) level, such that a plurality of containers simultaneously occupy a unique user space while sharing a single instance of an operating system (OS), network connections, and a base file system. In contrast, each VM instance may require its own unique instance of an OS.

The job database 404 may include any repository that stores jobs, which may also be referred to herein as workloads. A job may include an application that is written to fulfill a particular purpose, such as, for example, a word count application or a TeraSort application. Each job stored within the job database 404 may include one or more attributes that describe characteristics of the job. For example, the job may include attributes that describe a CPU load or network workload of the job. In one embodiment, the characteristics may be determined during a previous execution of the job. In other words, the job database 404 may maintain job characteristics for jobs that have been previously executed by the tuning system 400. Further, each job stored within the job database 404 may include a job configuration. The job configuration may include values for parameters at one or more of a job-level, a task-level, and an infrastructure-level for ensuring optimal execution of the job.

The offline tuning component 402 profiles jobs utilizing the job profiler 410. In particular, the offline tuning component 402 may receive a job, or retrieve a job from the job database 404, perform test runs of the job, and determine, using the job profiler 410, attributes and statistics for the job based on the test runs. By executing a test run of a job, resource consumption patterns for the job may be determined. For example, CPU usage, memory usage, disk usage, and I/O statistics may be collected for the job. Using these statistics, resource consumption patterns may then be determined, and used for subsequent tuning.

In one embodiment, the tuning advisor 412 of the offline tuning component 402, during or after execution of a job, selects parameters for reconfiguring the job. The job may then be executed using the reconfigured parameters. The reconfigured job may run more efficiently than the previous execution of the job. In one embodiment, the tuning advisor 412 may use a hill climbing search algorithm for selecting the parameters.

In one embodiment, application parameters and VM size parameters may be co-dependent. As an example of such a dependency, it may be pre-determined that mapped memory must always be greater than a size of particular parameters of a MapReduce job. As a result, parameters controlling a size of the mapped memory may be tuned in conjunction with parameters of the MapReduce job such that the mapped memory is always greater than the size of the particular parameters of the MapReduce job.

Similarly, the online tuning component 406 may determine how to tune, for further execution, jobs that are running on one or more test cluster 472 or production clusters 474. As shown in FIG. 4, the online tuning component 406 is in communication with the communicator 408. The management platform 450 obtains job/cluster statistics from jobs executing on the analytics clusters, and provides the statistics to the communicator 408, which provides the statistics to the online tuning component 406 for use by the tuning advisor 420. In other words, the online tuning component 406 utilizes the communicator 408 in conjunction with the management platform 450 for obtaining job/cluster statistics regarding the test cluster 472 and the production cluster 474.

In one embodiment, when a job is executed in a test environment or production environment (i.e., on the test cluster 472 or production cluster 474, respectively), statistics regarding job and cluster resource utilization may be monitored. Such statistics may include CPU usage, memory usage, network I/O, etc., as discussed in more detail below.

Further, in some embodiments, the online tuning component 406 may provide to the communicator 408 commands for changing job/cluster parameters. In response to the commands from the online tuning component 406, the communicator 408 may instruct the management platform 450 to change parameters of a job/cluster.

In various embodiments, the management platform 450 may include any management layer that instantiates VMs, provisions VMs, or otherwise manages VMs in any manner. The management platform 450 may receive instructions for instantiating VMs, such as a number of and size of VMs to be instantiated. The number and size of the VMs may be based on a data analytics application that will be executed. In one embodiment, the management platform 450 may include an OpenStack Cloud Management Platform.

In this manner, a cluster may be configured at the VM/container level by determining a number of VMs/ containers, as well as the configurations of the VMs/containers, such as a number of CPUs or cores and memory size. Further, based on the VM/container configuration, a data analytics platform and application parameters may be configured.

Figure 5:
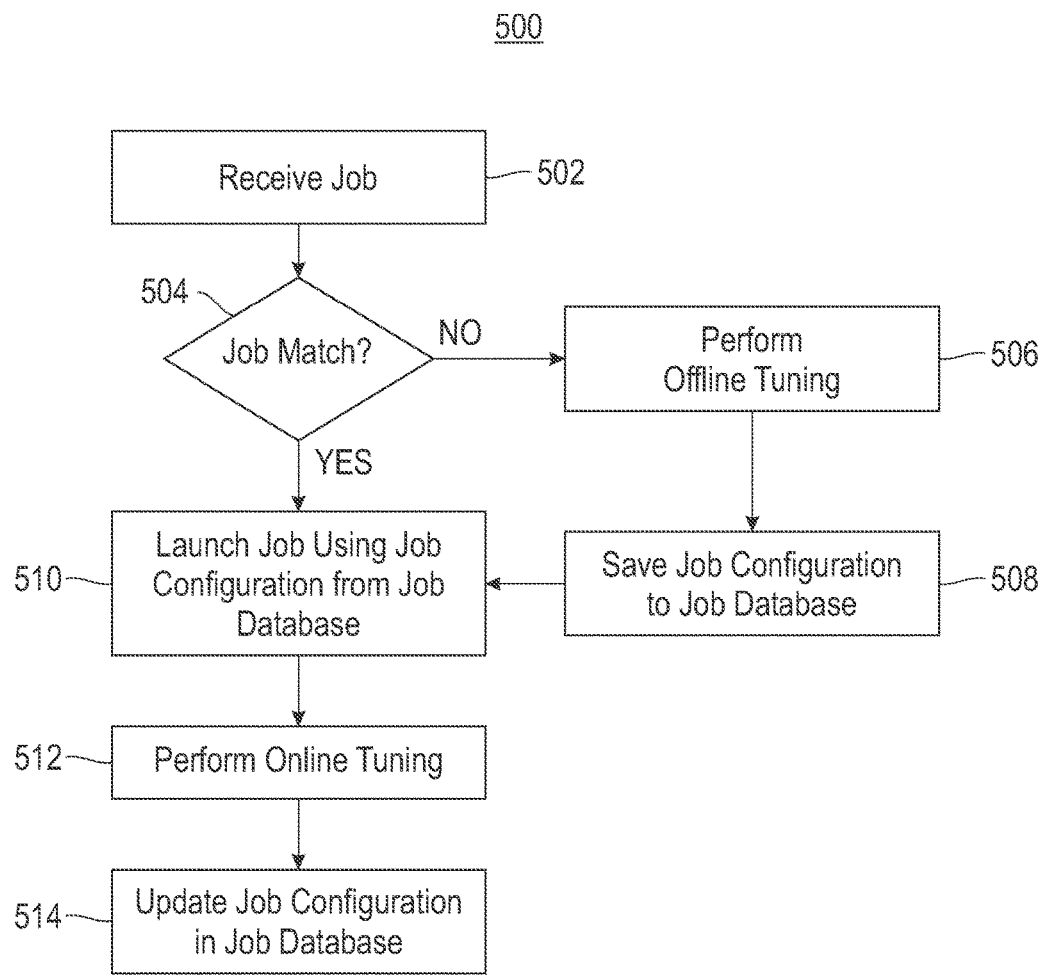
FIG. 5 shows a method for vertical parameter tuning, in accordance with another embodiment.

Now referring to FIG. 5, a flowchart of a method 500 for vertical parameter tuning is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a job is received. In one embodiment, the job may be received from a job queue or from a client. As noted above, the job may include an application that is written to fulfill a particular purpose, such as, for example, a word count application or a TeraSort application. A word count application may include an application that crawls a plurality of documents, such as web pages, and then outputs, for each word within the documents, a frequency for the word. Accordingly, in addition to an application, the job may include a data set or other input for processing by the application. Still yet, the job may include a plurality of values for parameters of the execution environment of the job.

Further, at operation 504, it is determined whether the job matches another job in a job database, such as the job database 404 described within the context of FIG. 4.

In one embodiment, the job matching may be performed transparent to a client or user. In other words, a client submitting a job may not be aware that the job has been matched against another job in the job database. The client may simply provide a job comprising an application and a data set, and, in return, receive a result of the job.

If the job does not match another job in the job database, then, at operation 506, offline tuning is performed. The offline tuning of the job may including tuning various parameters at an infrastructure-level (e.g., VM or container parameters, etc.), and/or at an application-level (e.g., job-level parameters, task-level parameters, etc.). In one embodiment, job-level and/or task-level parameters may be determined using a similar job or a test job. In other words, even though the job does not match another job in the job database, a similar job may be identified, and parameters of the similar job may be utilized to provide an initial configuration of job-level and/or task-level parameters for the received job.

As used herein, job-level parameters may include one or more of: a number of mappers, a number of reducers, utilization of compression, a type of compression if compression is used, input, shuffle, slow start, and a reducer start time. Such job-level parameters may be tightly related to the data analytics platform that the job is running on.

As used herein, task-level parameters may include one or more parameters for adjusting buffer usage and/or resource allocation, such as mapper and/or reducer resource allocation for each task. In particular, task-level parameters may include one or more of: memory allocated to a task, CPUs allocated to a task (e.g., map tasks, reduce tasks, etc.), io.sortmb size, buffer size such as a size of a shuffle buffer and/or a size of an input buffer, a merge threshold, a sort factor, and a shuffle factor. For example, CPU and memory parameters configured for map tasks may be different than CPU and memory parameters configured for reduce tasks of the same job. Together, job-level parameters and task-level parameters may be herein referred to as application-level parameters.

Further, VM/container parameters, also referred to herein as infrastructure-level parameters, may be tuned during the offline tuning of operation 506. The infrastructure parameters may be tuned based on constraints imposed by the job-level and/or task-level parameters. For example, a memory allocation may be configured for each VM/container, as well as a number of mappers and memory priorities. Additional infrastructure-level parameters may include one or more of: whether VMs are used, containers are used, or both VMs and containers are used, cluster topology, VM/container size, a number of mappers and/or reducers per VM/container, memory size, CPU cores, CPU speed, I/O, and priority.

Still yet, in some embodiments, an extent of the offline tuning may be adjusted. For example, as a first option, a client or administrator may configure the offline tuning such that the offline tuning performs a quick and rough estimation of parameters for the job, and completes within seconds or minutes. As another option, the client or administrator may configure the offline tuning such that the offline tuning performs a more comprehensive estimation of parameters for the job, and completes within tens of minutes, hours, etc. In configurations where the offline tuning is configured for a more quick estimation of job parameters, the job may undergo a greater number of online tuning adjustments than if the offline tuning had been performed more comprehensively.

Accordingly, after offline tuning has been performed at operation 506, initial job-level parameters, task-level parameters, and infrastructure-level parameters may be identified for the job.

After offline tuning is performed, a configuration of the job is saved to the job database at operation 508. In other words, the job-level parameters, the task-level parameters, and the VM/container parameters may be stored, in association with the job, to the job database. In this manner previously determined job configurations may be stored and retrieved for subsequent runs of jobs.

If, at operation 504, the received job does match another job in the job database, then an initial configuration for the job is determined using the matching job in the job database. In other words, if a profile of the received job has been previously stored in the job database, then the initial configuration for the job may be known based on prior configurations, without need to perform any offline tuning. For example, based on a match of the received job to a job stored in the job database, and a size of the data set received with the job, a number of VMs/containers may be rapidly determined for executing the job across clusters of a production environment.

In one embodiment, a number of VMs/containers may be determined based on a service level agreement (SLA) or client-specified job completion time. For example, a SLA may require that the client's job be completed within 24 hours. As another example, a client may explicitly specify a completion time of the job. For example, with a job submission, the client may specify that the job is to be completed in 8 hours, 12 hours, 24 hours, by noon tomorrow, etc.

Accordingly, based on a previous profiling of the job, and a size of a data set of the job, it may be determined how many VMs/containers are required for job execution, as well as values for parameters of the VMs/containers, such as a number of CPU cores, and memory size. The determined VMs/containers may then be instantiated within a production environment, such as the production cluster 474 described within the context of FIG. 4.

Further, at operation 510, the job is launched using the job configuration from the job database. If a job match was found at operation 504, then the job configuration may be a configuration from the matched job. However, if no job match was found at operation 504, then the job configuration may be the job configured saved to the job database at operation 508, as a result of offline tuning. In one embodiment, the job is launched in a production environment at operation 510.

After launching the job, the job may be monitored. Based on the monitored performance of the job, online tuning of the job is performed at operation 512. The online tuning of the job may include vertically tuning application-level parameters and infrastructure-level parameters between phases of execution of the job. The updated application-level parameters and infrastructure-level parameters may be determined based on monitored job statistics, job characteristics, and cluster resource utilization. In one embodiment, the online tuning may utilize a cost-based model or a rule-based model to update application-level parameters. A cost-based model or a rule-based-based model may also be used to update infrastructure-level parameters. Accordingly, using such models, application-level parameters and infrastructure-level parameters for the job may be continuously tuned between phases of execution of the job. In one embodiment, the application-level parameters and infrastructure-level parameters may include, for example, container and analytics engine parameters.

For example, if a cluster of 20 VMs is instantiated, each of the VMs with 8 GB of memory, and monitoring resource utilization of the job shows that each task is not using all of the allocated memory, then the online tuning may adjust parameters to more efficiently use the memory. In other words, the online tuning of operation 512 may include shrinking a memory allocation of the VMs. More specifically, if monitoring resource utilization of the job shows that each task is allocated 1 GB memory, but is only using 512 MB of memory, then memory allocation for each task may be shrunk to 768 MB of memory. In one embodiment, such an adjustment may be done dynamically, so that more tasks may be run simultaneously, resulting in increased resource utilization and reduction of job execution time. After adjusting the job, parameters of the job in the job database may be updated to reflect a memory allocation of 768 MB per task, instead of the prior allocation of 1 GB per task, as discussed below.

Additionally, at operation 514, the job configuration is updated in the job database. In this manner, any updates made to job-level, task-level, or infrastructure-level parameters during the online tuning process will be saved to the job database for subsequent runs of the job.

Accordingly, the method 500 provides a mechanism by which a client may submit a job for a data analytics platform application, and a cloud data center may determine, based on the job, job-level, task-level, and infrastructure-level parameters for optimally executing the job.

Figure 6A:
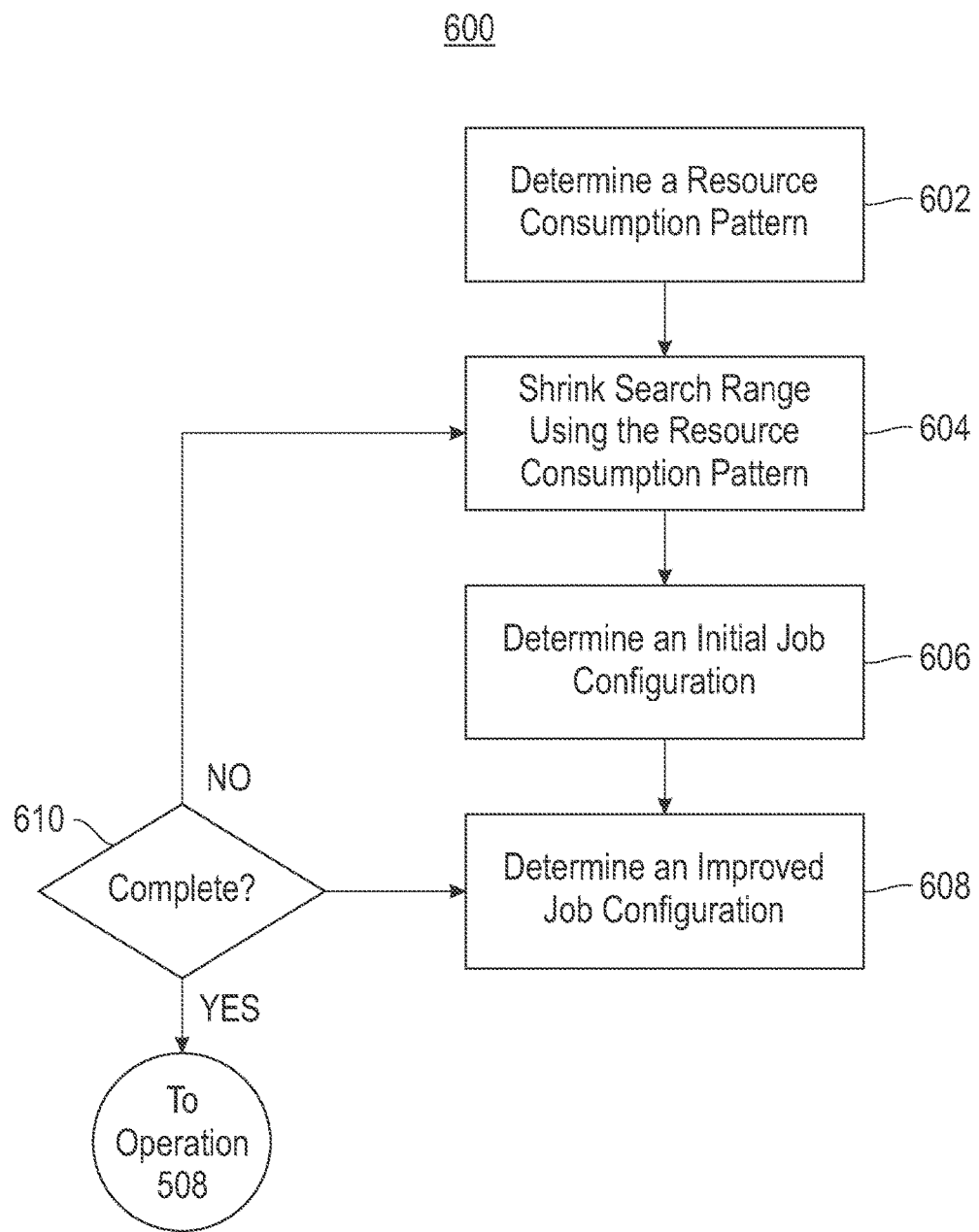
FIG. 6A shows a method for performing offline tuning, according to one embodiment.

Now referring to FIG. 6A, a flowchart of a method 600 for performing offline tuning is shown, according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Execution of the method 600 for performing offline tuning may occur at operation 506 of the method 500 of FIG. 5, which is discussed in more detail above. As shown in FIG. 6A, method 600 initiates with operation 602, where a resource consumption pattern of a job is determined. The job may include, for example, an application implementing the MapReduce framework, which may otherwise be referred to as a MapReduce job. Further, the resource consumption pattern for the job may include one or more of: CPU usage, memory usage, disk usage, network I/O consumption of tasks (e.g., map tasks, reduce tasks, etc.), input data, output data, and an intermediate data size.

Next, at operation 604, a search range is shrunk using the determined resource consumption pattern. The search range may include a range of values for each parameter of a plurality of parameters that may be adjusted for altering execution of the job. In one embodiment, the determined resource consumption pattern is used in conjunction with cross-stack level dependencies to shrink the search range.

For example, job-level parameters, task-level parameters, and infrastructure-level parameters may be dependent on each other. More specifically, a map memory may need to be greater than an io.sortmb size parameter, which may designate a size of a buffer used for sorting. Further, a choice of VM may depend on a map task allocation and/or reduce task allocation. Moreover, analytics application parameters and cloud storage parameters may be depend on each other. For example, a min/max split size may depend on a file system block size. Accordingly, such dependencies may be utilized to shrink the search range by eliminating invalid parameter values from the search range of one or more dimensions.

In this manner, using the consumption pattern and cross-stack level dependencies, the potential parameter value ranges may be shrunk.

At operation 606, an initial configuration is determined from within the search range. In one embodiment, a job database may store jobs based on resource consumption patterns of the jobs. Accordingly, the initial job configuration may be determined by identifying a job in the job database that has a similar resource consumption pattern. In one embodiment, similarity between jobs may be determined by a feature distance of the resource consumption patterns of the two jobs.

Further, at operation 608, an improved job configuration is determined. The improved job configuration may comprise a configuration for the job that executes more efficiently than the initial configuration selected from within the search range.

In one embodiment, the improved job configuration is determined using a hill climbing search algorithm. For example, a first number, n, of configurations may be chosen within a search space. Next, n searches may be deployed to determine a best configuration. The searches may account for usage characteristics, such as CPU utilization, memory utilization, disk I/O, network I/O, and threads per task. In particular, the improved job configuration may be determined based on a calculation of (a*CPU_utilization+b*memory_utilization+c/diskIO+d/networkIO+e*T_task/Max_task). Parameters a, b, c, d, and e can be set by a system to determine and normalize the weights of different factors. One embodiment can put equal weight to these parameters and set them to be 0.2, 0.2, 0.2, 0.2, and 0.2 respectively.

Further, at operation 610, it is determined whether the offline tuning is complete. In one embodiment, the offline tuning may be determined to be complete if a size of the search space utilized to determine the improved job configuration is smaller than a threshold size. In this way, if the searches converge to a sufficiently small search space, then it may be determined that no further parameter adjustments are necessary. In other words, in determining the improved job configuration, the search space may be shrunk with a center on the improved job configuration.

If, at operation 610, it is determined that the offline tuning is complete, then the method 600 is complete, and the job configuration is saved to the job database at operation 508, as described in the context of FIG. 5.

If, however, at operation 610, it is determined that the offline tuning is not complete, then the method 600 proceeds again to operation 604 to shrink the search range, and determine another improved job configuration. The offline tuning may be incomplete so long as a size of the search space utilized to determine the improved job configurations is larger than a threshold size.

Multiple test runs and iterations of the hill climbing search may be necessary to identify a best or final job configuration, especially in a large, highly-dimensional parameter space. The final job configuration for the job may be identified after tuning job-level, task-level, and infrastructure-level parameters for the job.

Figure 6B:
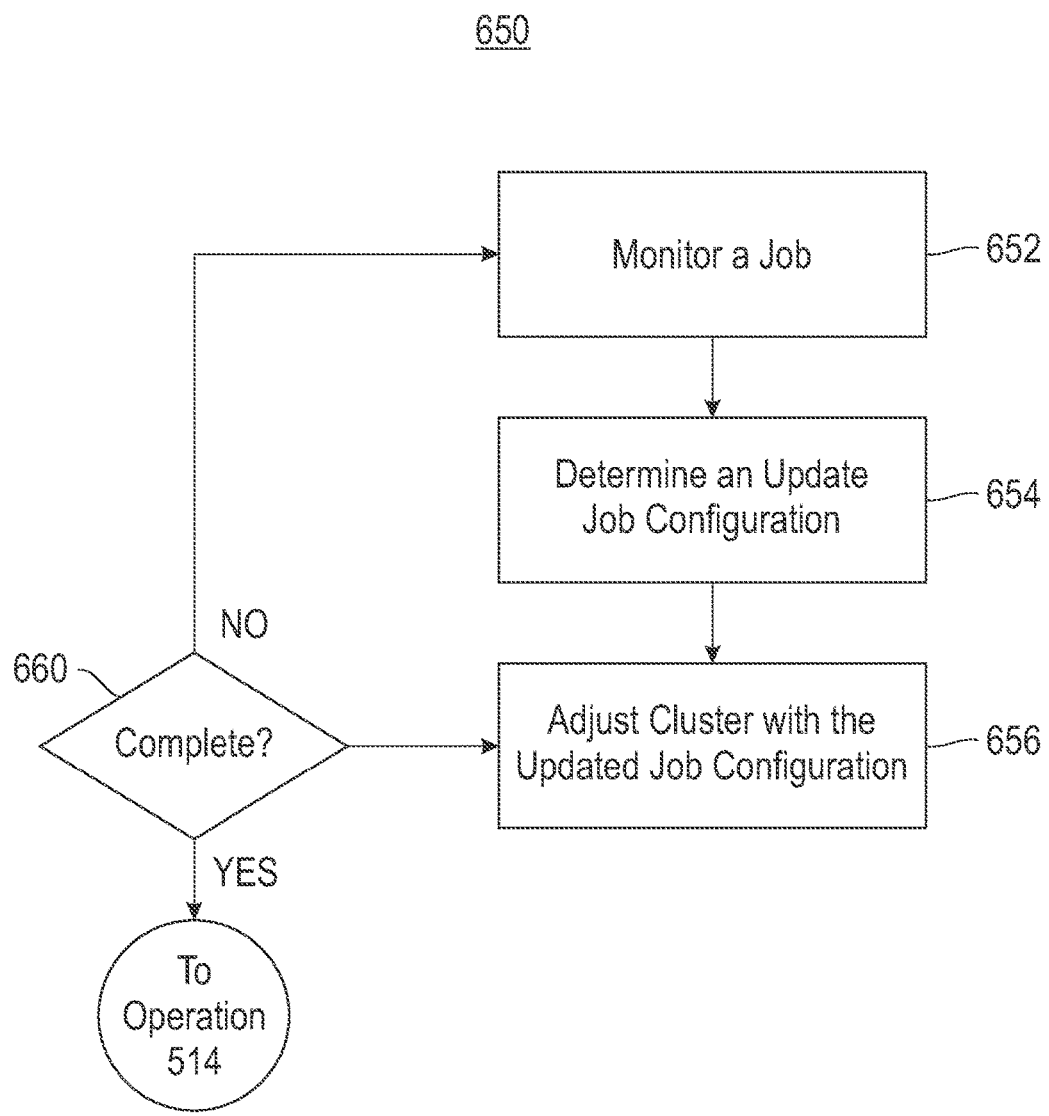
FIG. 6B shows a method for performing online tuning, according to yet another embodiment.

Now referring to FIG. 6B, a flowchart of a method 650 is shown for performing online tuning, according to one embodiment. The method 650 may be performed in accordance with the present invention in any of the environments depicted in FIGS. 1-5, among others, in various embodiments. Of course, more or less operations than those specifically described in FIG. 6B may be included in method 650, as would be understood by one of skill in the art upon reading the present descriptions.

Each of the steps of the method 650 may be performed by any suitable component of the operating environment. For example, in various embodiments, the method 650 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 650. Illustrative processors include, but are not limited to, a central processing unit (CPU), an application specific integrated circuit (ASIC), a field programmable gate array (FPGA), etc., combinations thereof, or any other suitable computing device known in the art.

Execution of the method 650 for performing online tuning may occur at operation 512 of the method 500 of FIG. 5, which is discussed in more detail above. As shown in FIG. 6B, method 650 initiates with operation 652, where a job is monitored. As noted above, the job may include, for example, a MapReduce job. In one embodiment, monitoring the job includes dynamically monitoring job statistics. Moreover, monitoring the job may further include monitoring cluster resource utilization. Monitored job statistics and cluster resource utilization may include one or more of: CPU usage, memory usage, disk usage, network I/O consumption of tasks (e.g., map tasks, reduce tasks, etc.), input data, output data, and an intermediate data size.

Next, at operation 654, an updated job configuration is determined. In one embodiment, a job database may be used to determine the updated job configuration. In another embodiment, a cost-based model and/or a rule-based model may be utilized to determine the updated job configuration.

For example, a cost-based model may monitor output of a map task to estimate a size of a sort buffer, such as io.sortmb. Further, the cost-based model may monitor input of a reduce task to estimate a size of a reduce buffer. Still yet, the cost-based model may update a value of a parameter that controls the sort buffer, update a value of a parameter that controls a size of the reduce buffer, and/or update LXC container size proportional to resource allocation of a map task or a reduce task. Accordingly, using a job log it may be possible to determine memory consumption, and use this information for adjusting a cluster configuration.

As another example, a rule-based model may determine an updated job configuration based on resource utilization. For example, if CPU usage is determined to be above a threshold, then CPU allocation may be increased. However, if CPU usage is determined to be below a threshold, then CPU allocation may be decreased. Similarly, if memory usage is determined to be above a threshold, then memory allocation may be increased; and if memory usage is determined to be below a threshold, then memory allocation may be decreased. Accordingly, CPU and memory allocation may be increased/decreased based on utilization.

In one embodiment, if the job includes a MapReduce job, use of a reduce buffer of the job may be determined. The use of the reduce buffer may be estimated by monitoring inputs to reduce tasks, and aggregating these inputs. The inputs may come from a plurality of reduce tasks. Moreover, based on usage of the reduce buffer, an updated reduce buffer size may be determined.

Further, a cluster executing the job is adjusted with the updated job configuration at operation 656. In some embodiments, the cluster may be adjusted with the updated job configuration during execution of tasks of the job. For example, a given numbers of tasks of the job may be run concurrently such that the tasks run in phases (i.e., phases of 8 tasks, 10 tasks, 16 tasks, etc.). During a first phase of the given number of tasks, the job may be monitored, and an updated job configuration may be determined. After the first phase of tasks completes, the cluster may be adjusted (e.g., memory allocation increased, memory allocation decreased, CPU allocation increased, CPU allocation decreased, etc.). Subsequently, a second phase of tasks may be executed utilizing the updated cluster configuration. In this manner, infrastructure-level parameters and application-level parameters for the job may be dynamically and vertically tuned during execution, and between phases of the job.

At operation 660, it is determined whether the online tuning is complete. In one embodiment, the online tuning may be determined to be complete if the job has completed executing. In this manner, the online tuning of the job may continue for the entirety of the execution of the job, such that a production cluster is continually adjusted based on monitored job statistics and/or cluster resource utilization.

If, at operation 660, it is determined that the online tuning is complete, then the method 650 is complete, and the job configuration is updated within the job database at operation 514, as described in the context of FIG. 5. If, however, at operation 660, it is determined that the online tuning is not complete, then the method 600 proceeds again to operation 652, where the job continues to be monitored for determining an updated job configuration.

In the embodiments disclosed hereinabove, cloud infrastructure parameters may be considered in conjunction with data analytics platform parameters for tuning a cluster to realize improved resource utilization. In this manner, a job and the cluster it is executing on may be holistically and vertically optimized based on dependencies between job-level, task-level, and infrastructure-level parameters.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, the computer program product comprising a computer readable storage medium having program instructions embodied therewith, the program instructions executable by a processor to cause the processor to:
    receive, by the processor, an application;
    determine, by the processor, whether the application matches another application saved to a database;
    in response to determining that the application does not match another application saved to the database:
        perform, by the processor, one or more test runs of the application,
        determine, by the processor, one or more resource consumption patterns for the application, based on the one or more test runs of the application,
        estimate, by the processor, one or more parameters of the application, based on the one or more resource consumption patterns, and
        save, by the processor, a configuration for the application to the database, where the configuration includes the one or more estimated parameters of the application;
    in response to determining that the application does match another application saved to the database:
        execute, by the processor, the application using the saved configuration for the matching application, including one or more parameters of the matching application, from the database,
        monitor, by the processor, statistics and resource usage during the execution of the application,
        update, by the processor, the one or more parameters of the application for the application, based on the statistics and the resource usage, the updating including:
            estimating a size of a sort buffer, based on a monitored output of a map task,
            estimating a size of a reduce buffer, based on a monitored input to a reduce task,
            updating a value of a parameter that controls a size of the sort buffer, and
            updating a value of a parameter that controls a size of the reduce buffer;
        adjust, by the processor, the execution of the application, utilizing the updated one or more parameters of the application; and
        save, by the processor, the updated one or more parameters of the application to the saved configuration for the application to the database.

2. The computer program product of claim 1, wherein the application is launched using the saved configuration for the matching application from the database, without performing offline tuning, in response to determining that the application matches the matching application saved to the database.

3. The computer program product of claim 1, wherein the one or more parameters of the application include a number of mappers, a number of reducers, a utilization of compression, a type of compression if compression is used, an input, a shuffle, a slow start, and a reducer start time, and
    the one or more resource consumption patterns for the application include CPU usage, memory usage, disk usage, network I/O consumption of tasks, input data, output data, and an intermediate data size.

4. The computer program product of claim 1, wherein updating the one or more parameters of the application for the matching application further includes:
    increasing a CPU allocation in response to determining that CPU usage is above a threshold;
    decreasing a CPU allocation in response to determining that CPU usage is below a threshold;
    increasing a memory allocation in response to determining that memory usage is above a threshold; and
    decreasing a memory allocation in response to determining that memory usage is below a threshold.

5. The computer program product of claim 1, wherein updating the one or more parameters of the application for the application further includes:
    monitoring inputs to a plurality of reduce tasks;
    estimating a use of a reduce buffer by aggregating the inputs to the plurality of reduce tasks; and
    determining an updated reduce buffer size, based on the use of the reduce buffer.

6. The computer program product of claim 1, wherein the application includes a MapReduce application that implements one or more of map tasks and reduce tasks.

7. The computer program product of claim 1, wherein each application stored within the application database includes:
    attributes that describe a CPU load or network workload of the application, and an application configuration including values for parameters at one or more of an application-level, a task-level, and an infrastructure-level.

8. The computer program product of claim 1, further comprising program instructions executable by the processor to cause the processor to identify, by the processor, a second application in the application database with a second resource consumption pattern similar to the one or more resource consumption patterns of the application.

9. The computer program product of claim 8, wherein the second application in the application database is identified as being similar to the application based on a similarity between a feature distance of the one or more resource consumption patterns and the second resource consumption pattern.

10. The computer program product of claim 1, wherein:
the application is to be run on a virtual machine, a container, or a virtual machine and a container, and
one or more parameters of the virtual machine, the container, or the virtual machine and the container, and the one or more parameters of the application, are estimated utilizing a hill climbing search algorithm.

11. A method, comprising:
receiving an application;
determining whether the application matches another application saved to a database;
in response to determining that the application does not match another application saved to the database:
performing one or more test runs of the application,
determining one or more resource consumption patterns for the application, based on the one or more test runs of the application,
estimating one or more parameters of the application, based on the one or more resource consumption patterns, and
saving a configuration for the application to the database, where the configuration includes the one or more estimated parameters of the application;
in response to determining that the application does match another application saved to the database:
executing the application using the saved configuration for the matching application, including one or more parameters of the matching application, from the database,
monitoring statistics and resource usage during the execution of the application,
updating the one or more parameters of the application for the application, based on the statistics and the resource usage, the updating including:
estimating a size of a sort buffer, based on a monitored output of a map task,
estimating a size of a reduce buffer, based on a monitored input to a reduce task,
updating a value of a parameter that controls a size of the sort buffer, and
updating a value of a parameter that controls a size of the reduce buffer;
adjusting the execution of the application, utilizing the updated one or more parameters of the application; and
saving the updated one or more parameters of the application to the saved configuration for the application to the database.

12. The method of claim 11, wherein the application is launched using the saved configuration for the matching application from the database, without performing offline tuning, in response to determining that the application matches the matching application saved to the database.

13. The method of claim 11, wherein the one or more parameters of the application include a number of mappers, a number of reducers, a utilization of compression, a type of compression if compression is used, an input, a shuffle, a slow start, and a reducer start time, and
the one or more resource consumption patterns for the application include CPU usage, memory usage, disk usage, network I/O consumption of tasks, input data, output data, and an intermediate data size.

14. The method of claim 11, wherein updating the one or more parameters of the application for the matching application further includes:
increasing a CPU allocation in response to determining that CPU usage is above a threshold;
decreasing a CPU allocation in response to determining that CPU usage is below a threshold;
increasing a memory allocation in response to determining that memory usage is above a threshold; and
decreasing a memory allocation in response to determining that memory usage is below a threshold.

15. The method of claim 11, wherein updating the one or more parameters of the application for the application further includes:
monitoring inputs to a plurality of reduce tasks;
estimating a use of a reduce buffer by aggregating the inputs to the plurality of reduce tasks; and
determining an updated reduce buffer size, based on the use of the reduce buffer.

16. The method of claim 11, wherein the application includes a MapReduce application that implements one or more of map tasks and reduce tasks.

17. The method of claim 11, wherein each application stored within the application database includes:
attributes that describe a CPU load or network workload of the application, and an application configuration including values for parameters at one or more of an application-level, a task-level, and an infrastructure-level.

18. The method of claim 11, further comprising identifying a second application in the application database with a second resource consumption pattern similar to the one or more resource consumption patterns of the application.

19. The method of claim 18, wherein the second application in the application database is identified as being similar to the application based on a similarity between a feature distance of the one or more resource consumption patterns and the second resource consumption pattern.

20. A system, comprising:
a processor; and
logic integrated with the processor, executable by the processor, or integrated with and executable by the processor, the logic being configured to cause the processor to:
receive an application;
determine whether the application matches another application saved to a database;
in response to determining that the application does not match another application saved to the database:
perform one or more test runs of the application,
determine one or more resource consumption patterns for the application, based on the one or more test runs of the application,
estimate one or more parameters of the application, based on the one or more resource consumption patterns, and
save a configuration for the application to the database, where the configuration includes the one or more estimated parameters of the application;
in response to determining that the application does match another application saved to the database:

execute the application using the saved configuration for the matching application, including one or more parameters of the matching application, from the database, monitor statistics and resource usage during the execution of the application, update the one or more parameters of the application for the application, based on the statistics and the resource usage, the updating including:

estimating a size of a sort buffer, based on a monitored output of a map task, estimating a size of a reduce buffer, based on a monitored input to a reduce task, updating a value of a parameter that controls a size of the sort buffer, and updating a value of a parameter that controls a size of the reduce buffer;

adjust the execution of the application, utilizing the updated one or more parameters of the application; and save the updated one or more parameters of the application to the saved configuration for the application to the database.

\* \* \* \* \*